United States Patent [19]
Yukuta et al.

[11] 3,864,324
[45] Feb. 4, 1975

[54] METHOD FOR PRODUCING HYDROXYL FUNCTIONAL POLYMERS

[75] Inventors: Toshio Yukuta; Takashi Ohashi; Yoshiko Taniguchi; Katsuhiko Arai, all of Tokyo, Japan

[73] Assignee: Bridgestone Tire Company Limited, Tokyo, Japan

[22] Filed: Aug. 1, 1973

[21] Appl. No.: 384,536

[30] Foreign Application Priority Data
Aug. 1, 1972 Japan................................. 47-77180

[52] U.S. Cl....... 260/94.7 A, 260/94.7 D, 260/82.1, 260/92.8 A, 260/87.7
[51] Int. Cl............................................. C08d 5/04
[58] Field of Search......... 260/94.7 A, 82.1, 92.8 A, 260/87.7

[56] References Cited
UNITED STATES PATENTS
3,312,744   4/1967   Fair et al. .................. 260/94.7 A X Primary Examiner—William F. Hamrock
Attorney, Agent, or Firm—Sughrue, Rothwell, Mion, Zinn & Macpeak

[57] ABSTRACT

Hydroxyl functional polymers having a molecular weight of about 500 to 50,000 are produced by subjecting some of the double bonds in a high polymer containing olefinically unsaturated double bonds to ozone-decomposition using ozone-containing gas and reducing the ozonides by means of a reducing agent having the general formula $$NaAlH_2(OR'OR)_2$$

wherein R and R' are the same or different aliphatic hydrocarbon residues having 1 to 4 carbon atoms to form the hydroxyl functional polymers.

18 Claims, No Drawings

METHOD FOR PRODUCING HYDROXYL FUNCTIONAL POLYMERS

BACKGROUND OF THE INVENTION

1. Field of the Invention

The present invention relates to a method for producing the hydroxyl functional group containing polymers having a molecular weight of about 500 to 50,000 and containing hydroxyl functional groups at both ends and/or on the side chains of the molecule.

2. Description of the Prior Art

A large number of hydrocarbon polymers previously known are almost nonfunctional polymers having a high molecular weight. Polymers containing carbon-carbon unsaturated bonds in the main chain of the molecule and having hydroxyl functional groups have not been known so much. The conjugated diene homopolymers or copolymers having hydroxyl functional groups are produced by forming polymers having active terminal groups as so-called "living polymers" through an anion polymerization process using an organometallic compound of sodium or lithium as an initiator and then adding an alkylene oxide and the like to the resulting polymers to provide the hydroxyl functional groups, or through an emulsion polymerization process using a radical initiator, such as hydrogen peroxide, a hydroxyl functional group containing azo compound and the like. However, in the hydroxyl functional group containing polymers obtained by "living polymerization," the cis-1,4 unit, which is the preferable microstructure for general purpose rubber, is difficultly obtained and the functionality is low; with these polymers it is very difficult to obtain functionality near 2.0 and there are other various undesirable problems as well. On the other hand, in the hydroxyl functional polymers obtained by the radical polymerization process, the functionality readily becomes more than 2.0. In consequence, the elastomers having net-work structure obtained by reacting these polymers with various chain extenders or cross-linking agents, such as isocyanate compounds, amine compounds and the like, are weak in the strength, are not easily processable and readily cause gelation in the processing. Accordingly, the development of the hydroxyl functional group containing polymers having the microstructure of general purpose rubber, a functionality near 2.0 and an excellent processability has been demanded. It is noted that, as polymers having the hydroxyl functional groups, polyesters or polyethers which are the starting materials for urethane elastomers, have been well known, but these polymers contain oxygen atoms in addition to carbon atoms in the main chain of the molecule and do not contain unsaturated bonds; consequently the elastomers obtained by chain extending and cross-linking of these polymers are considerably different from the elastomers having the general purpose rubber microstructure. Accordingly, the elastomers having the foregoing structure are not suitable as general purpose rubber. For all of the above described reasons, the liquid polymers having unsaturated bonds, the microstructure of general purpose rubber and the hydroxyl functional groups at both ends, in which the main chain of the polymer is composed of only carbon atoms, have been particularly required and the development thereof has been demanded.

Heretofore, it has been well known that substances having the olefinically unsaturated bonds, for example, natural rubber, synthetic rubbers and rubber articles react with ozone; further it is known as a result of ozonolysis or ozonization, these substances having the unsaturated bonds or the polymer chain are converted into oxidized substances having shorter chains. Also, it is known that the oxidized compounds, that is "ozonides" obtained by ozonolysis or ozonization can be reduced by means of a reducing agent into hydroxyl functional group containing compounds. For example, C.S. Marvel et al. proposed (J. Polymer Sci., A2, 5313-5318 (1964)) that isobutylene-isoprene copolymer or isobutylene-butadiene copolymer be ozoned and the resulting ozonides be reduced by a reducing agent of lithium aluminum hydride to obtain $\alpha,\omega$-glycol of polyisobutylene. However, such a process cannot adjust the molecular weight of the resulting polymers. Thus, the butyl rubbers which are copolymers of isobutylene and isoprene or isobutylene and butadiene are limited in the molecular weight of the resulting functional polymers by their content of the unsaturated bonds.

C.R. McIntosh et al. disclosed (Japanese Pat. No. 460,919, British Pat. No. 984,071, J. Polymer Sci., Part A-1, 6, 1037-1043 (1968)) that polybutadiene having a high cis-1,4 unit content can be ozonized to form ozonides and then the ozonides are reduced by means of lithium aluminum hydride to obtain a liquid polymer having a molecular weight of 200-400 and the hydroxyl functional groups. However, this process can provide only the hydroxyl functional polymer having a very low molecular weight, that is about 200-400; polymers having such a low molecular weight cannot provide a useful rubbery elastomer.

An object of the present invention is to provide hydroxyl functional polymers having the microstructure of general purpose rubber and a functionality near 2.0, the molecular weight of which can be freely adjusted in order to obtain a useful rubbery elastomer.

In connection with such a purpose, the inventors have broadly studied processès regarding the ozonization reaction and the reduction reaction of the resulting ozonides.

It has been disclosed by the present inventors in U.S. Pat. application Ser. No. 143,645 that some of the double bonds of high polymers containing olefinically unsaturated double bonds can be ozonized and the resulting ozonides reduced by a reducing agent to produce the hydroxyl functional polymers having a molecular weight of 700 to 30,000. In this case, as the reducing agent, use is made of lithium aluminum hydride (LiAlH$_4$) or sodium borohydride (NaBH$_4$).

It has been found, however, that when the reduction is effected by means of lithium aluminum hydride, gelation occurs depending upon the polymer of the starting material and the reaction condition (this is disclosed in Japanese Patent application publication No. 36,273/72). For example, this phenomenon is particularly noticeable in the case of butadiene-acrylonitrile random copolymer or butadiene-acrylonitrile alternate copolymer; when the formed hydroxyl functional polymer contains gel, the vulcanization or cross-linking step for the copolymers is very difficult and the vulcanized product cannot be used practically. Furthermore, when the ozonides of cis-1,4-polybutadiene are to be reduced by means of a reducing agent of lithium aluminum hydride, the reduction reaction must be effected at a temperature of −10°C by cooling and further there is a danger of ignition at a stage for obtaining the product from the reaction mixture. Moreover, lithium aluminum hydride reacts vigorously with water at room temperature and therefore when lithium aluminum hydride is allowed to stand for a long time in air, it reacts with moisture in air and the activity is substantially lost.

When the ozonides of the high polymers having olefinically unsaturated double bonds are reduced to form the hydroxyl functional polymers, if sodium borohydride is used as a reducing agent, the above-described problems which are caused by the use of lithium aluminum hydride, can be obviated (this is disclosed in Japanese Patent application publication No. 36,273/72). However, while sodium borohydride is homogeneously dissolved in a solvent having a high boiling poing and a high polarity, for example, ether solvents, such as diethylene glycol dimethyl ether (as with lithium aluminum hydride) it is poorly soluble in the ordinarily used organic solvents. Accordingly, when the reduction reaction is effected by means of these reducing agents, it is necessary to effect a heterogeneous reaction using a suspension of said reducing agents in an ether solvent and the like and there are various problems in view of storage, activity maintenance and the like. Particularly, in the case of lithium aluminum hydride, diethyl ether to be used as the solvent is highly dangerous and needs a careful handling.

An object of the present invention, therefore, is to provide a novel method for producing hydroxyl functional polymers having a molecular weight of about 500 to 50,000 which does not cause the above described various problems which simplifies the process steps and is efficient.

SUMMARY OF THE INVENTION

The present invention comprises a method for producing hydroxyl functional polymers having a molecular weight of about 500 to 50,000 and containing hydroxyl functional groups terminally and/or on the side chains of the molecules. The method comprises subjecting a homopolymer or a copolymer having a high molecular weight and containing olefinically unsaturated double bonds represented by the general formula of —CH=CH— or CX$_2$=CH— wherein X is hydrogen, an alkyl group or an aryl group, to ozonization using a gaseous mixture containing ozone and reducing the resulting ozonides using a compound represented by the general formula NaAlH$_2$(OR'OR)$_2$ wherein R and R', as used throughout the specification and claims, are the same or different aliphatic hydrocarbon residues having 1 to 4 carbon atoms, as a reducing agent to form the hydroxyl functional polymers.

The compounds to be used as the reducing agent and represented by the general formula NaAlH$_2$(OR'OR)$_2$ are produced, for example by reacting a metallic sodium and a metallic aluminum with an alkoxyalcohol represented by general formula

ROR'OH wherein R and R' are aliphatic hydrocarbon residues having 1 to 4 carbon atoms. The reaction product containing the compounds represented by the general formulae NaAlH(OR'OR)$_3$ NaAlH$_3$(OR'OR)

as well as NaAlH$_2$(OR'OR)$_2$ may be used.

In the method of the present invention, the use of the compounds represented by the above-described general formula NaAlH$_2$(OR'OR)$_2$ for the reduction of the ozonides simplifies considerably the reduction reaction. For example, when sodium bis(2-methoxyethoxy)aluminum hydride is used as the reducing agent, it can be homogeneously dissolved in an organic solvent commonly used, such as benzene, toluene, tetrahydrofuran; the resulting solution is stable and easily usable for the reduction reaction. Accordingly, said reducing agent does not require a heterogeneous reaction using a suspension in a solvent having a low solubility, such as ether and the like as in the case of the reduction reaction using the conventional lithium aluminum hydride but can instead effect a homogeneous reaction. This enables a continuous process wherein the ozonization and the reduction reaction of the resulting ozonides can be carried out in a common solvent. It is a substantial advantage over the prior processes, considering the storage and activity maintenance, that the reducing agent can be dissolved in an ordinarily used organic solvent and is present stably in the solution form.

Sodium bis(2-methoxyethoxy)aluminum hydride does not react even if said compound is contacted with oxygen or air at room temperature under atmospheric pressure and consequently it is not necessary to store said compound in an inert gas; storage can be effected simply by corking closely at room temperature. Moreover, this compound is available commercially in a solution form.

The hydroxyl functional polymers having a molecular weight of about 500 to 50,000 obtained by the method of the present invention can be used for a variety of applications. For example, said polymer as such can be used as an adhesive; further, said polymer can be used as an elastomer by reacting with the other reagent to produce a polymer having a three dimensional network structure. Such a network shaped polymer can be obtained through a conventional chain extending or cross-linking reaction, for example, by a reaction with a diisocyanate compound.

The inventors have disclosed in U.S. Pat. application Ser. No. 143,645 that trimellitic anhydride monohalide is reacted with hydroxyl functional groups to form a polymer having acid anhydride functional groups. This application further discloses that the resulting polymer having acid anhydride functional groups can be reacted with a diepoxide compound to form an elastomer. In addition, U.S. Pat. application Ser. No. 245,611 has disclosed that the resulting polymer having acid anhydride functional groups can be reacted with a low molecular weight acid anhydride and a diepoxide compound to form an elastomer. U.S. Patent application Ser. No. 307,408 has disclosed that the resulting polymer having acid anhydride functional groups can be reacted with a nitrogen compound having multifunctional active hydrogens and a diepoxide compound to form an elastomer.

The specific applications of the polymers according to the present invention include adhesives, paints, cast molding materials, binders for solid fuel for rockets, commercial elastic materials having complicated shapes, coatings, reactive plasticizers, tire rubber and the like.

DETAILED DESCRPTION OF THE INVENTION

The polymers to be ozonized according to the present invention are high molecular weight homopolymers or copolymers containing olefinically unsaturated double bond units represented by the general formula

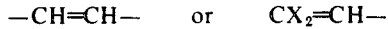

$$-CH=CH- \quad \text{or} \quad CX_2=CH-$$

wherein X is hydrogen, an alkyl or aryl group. The monomers to constitute these polymers are those having 4 to 8 carbon atoms and are preferably conjugated dienes and cycloolefins; among them, butadiene, isoprene, cyclopentene and the like are preferable. The copolymers of these monomers with styrene, α-methylstyrene, vinyl-naphthalene, butyl vinyl ether, vinylcarbazole, vinylfuran and the like may be used.

In the present invention, the reaction of the above-described polymers with ozone is effected under the following limited conditions. Namely, the above-described polymers are firstly dissolved in a solvent suitable for carrying out the ozonization reaction. The solvents suitable for the use include halogenated hydrocarbons, such as carbon tetrachloride, chloroform; linear or cyclic ethers, such as diethyl ether, tetrahydrofuran and dioxane; aromatic hydrocarbons, such as benzene, toluene, xylene; linear or cyclic paraffins, such as pentane, hexane, heptane, cyclohexane. When the above-described polymers to be treated are composed of only carbon atoms and hydrogen atoms, the solvent preferred is a halogenated hydrocarbon, particularly chloroform. When the polymerss to be treated are conjugated diene polymers containing heteroatoms other than carbon atoms and hydrogens, the preferred solvent is a halogenated hydrocarbon or linear or cyclic ethers. If the ozonization is effected using a halogenated hydrocarbon solvent, said solvent must be completely distilled off from the resulting ozonide solution and then the resulting ozonide is again dissolved in ethers or aromatic hydrocarbons to form a homogeneous solution, which is subjected to a reduction reaction. This is because the reducing agent and the halogenated hydrocarbon solvent react vigorously in a dehalogenation reaction; therefore, the reduction reaction could not be advanced selectively if the halogenated hydrocarbon solvent were present. On the other hand, when the ethers or aromatic hydrocarbons are used in the ozonization reaction as the solvent, the resulting ozonide solution can be applied directly to the reduction reaction and the process step can be simplified and such solvents contribute to the operation efficiency.

When lithium aluminum hydride has been used as the catalyst, diethyl ether, which has a low boiling point and is dangerous, has mainly been used in view of the solubility. According to the present invention, however, solvents having a relatively high boiling point, such as benzene or toluene, can be used and consequently the handling is easy. The reducing agents to be used in the present invention, such as sodium bis(2-methoxyethoxy)aluminum hydride are generally present stably in the benzene solution form. Sodium bis(2-methoxyethoxy)aluminum hydride is available commercially as about 70% solution in benzene and, therefore, when the ozonization is effected using a benzene solvent, the reduction reaction can be carried out by means of the same solvent. Furthermore, the above described solvents other than the halogenated hydrocarbons can be used as mixed solvents.

The concentration of the polymers when the ozonization is carried out, is generally 0.1 g/100 ml solvent to 50 g/100 ml solvent, preferably 1 g/100 ml solvent to 10 g/100 ml solvent. In the ozonization reaction, a gaseous mixture of free ozone and a carrier gas is used but, in general, ozone is used in a low content. Namely, the amount of ozone based on the carrier gas is generally 0.1 to 0.5% by weight (less than 6 mg of ozone per 1 l of carrier gas), and preferably 0.1 to 0.2% by weight. When ozone is used in an amount of more than 0.5% by weight, it is difficult to adjust the molecular weight freely and the gelation can be caused. The gaseous mixture containing ozone is permitted to bubble into the polymer solution at a temperature of about −20°C to +30°C by passing through an apparatus which makes the dispersion uniform, for example, a ball filter, until said mixture is added in a sufficient amount to react with some or all of the olefinically unsaturated bonds present in the polymer. The necessary amount of ozone can be determined from the content of the olefinically unsaturated bonds present in the polymer, inasmuch as one molecule of ozone reacts with one olefinically unsaturated bond. Namely, the theoretical amount can be determined by calculation from the cut degree necessary for formation of the hydroxyl functional polymer. However, in actual practice, an excess amount of ozone is used for obtaining the necessary cut degree. The ozonization rate varies depending upon the kind of double bonds contained in the polymers; the −CH=CH− linkage contained in the skeleton structure of the polymer is more difficulty ozonized than the $CX_2=CH-$ linkage extending outwardly from the skeleton structure as the side chain. If the ozonization reaction of polymers having a high content of the $CX_2=CH-$ double bonds (vinyl bond) is effected at a low temperature, the vinyl bonds in the side chains are preferentially ozonized and the ozonization temperature is an important requirement for the adjustment of the molecular weight of the product. The time for contacting with the gaseous mixture containing ozone is not particularly limited but is generally 0.5 to 24 hours. The carrier gas to transfer the free ozone includes oxygen, nitrogen, air, argon and the like.

The thus formed ozonide is subjected to the following reduction reaction. The reducing agent to be used for the reduction of the ozonides of conjugated dienes in the present invention is a compound represented by the general formula, $NaAlH_2(OR'OR)_2$, wherein R and R' represent the same or different aliphatic hydrocarbon residues having 1 to 4 carbon atoms. However, the compound may be used in admixture with compounds represented by the general formulae $NaAlH(OR'OR)_3$ and $NaAlH_3(OR'OR)$, which are formed in the production of the compound $NaAlH_2(OR'OR)_2$. When it is intended to use, for example, sodium bis(2-methoxyethoxy)aluminum hydride as the reducing compound, sodium bis(2-methoxyethoxy)aluminum hydride is commercially available in a benzene solution form. Therefore, the benzene solution of the reducing agent can be used after dilution with the same solvent or with a solvent which is miscible with the benzene solution, does not react with the reducing agent and dissolves the ozonides homogeneously. Such solvents include aromatic hydrocarbons, such as benzene, toluene and xylene; aliphatic and cyclic ethers, such as dimethyl ether, diethyl ether, di-n-propyl ether, di-i-propyl ether, di-n-butyl ether, tetrahydrofuran, dioxane, ethylene glycol dimethyl ether, diethylene glycol dimethyl ether and triethylene glycol dimethyl ether; cyclic hydrocarbons, such as cyclobutane and cyclohexane; and mixtures thereof. Among the above-described solvents, benzene is preferable. Further, tetrahydrofuran, diethylene glycol dimethyl ether and the like are advantageously used due to the solvent ability and the ease in the after-treatment. As described above, the method of the present invention is remarkably superior to a method using lithium aluminum hydride, which requires use of diethyl ether as a solvent and effectuation of the reduction reaction at a low temperature.

The reduction reaction of the present invention is preferably effected at a temperature of −20°C to 100°C. However, since the reducing agent of the present invention has a high activity and selectivity, it is preferable to effect the reduction reaction in dilute solution at a temperature of from 0°C to room temperature. That is, a predetermined amount of the reducing agent is added to the ozonide-containing solution kept at the above-described temperature, and the resulting solution is heated up to the boiling point of the solvent to complete the reaction. The reducing agent is used in an amount of 0.5–3.0 equivalents, preferably 1.2–2.0 equivalents, based on equivalent of the ozonides. In general, since the commercially available solution of the reducing agent sodium bis(2-methoxyethoxy) aluminum hydride in benzene has about 70% by weight concentration, it is preferred to use the benzene solution after dilution to 3–5 times its original volume.

After completion of the reduction reaction, water or a dilute aqueous solution of the acid is added to the reaction system to decompose excess reducing agent. The resulting hydroxyl functional polymer can be recovered from the reaction mixture by conventional recovering technics. The addition order of the reagent in the reduction reaction may be as follows. In general, the solution of reducing agent is added to the ozonide-containing solution. However, the reverse addition order may be adopted. That is, the ozonide-containing solution may be added to the solution of reducing agent.

When the reduction reaction of the present invention is effected, if highly stereospecific polymers, such as cis-1,4-polybutadiene, cis-1,4-polyisoprene and the like, are used as a starting material, the resulting hydroxyl functional polymers having a low molecular weight have the same stereospecific property as that of the starting highly stereospecific polymers. This fact is very important in the production of elastomers, because the properties of the resulting elastomer are highly influenced by the stereospecific properties of the polymer. Further, when it is intended to produce a hydroxyl functional polymer by using a high molecular weight polymer, such as cis-1,4-polyisoprene if the high molecular weight polymer has previously been masticated by means of a roll before the ozonization to prepare a polymer having a moderate molecular weight, and the resulting polymer is ozonized, the aftertreatment and other treatments after the ozonization and reduction reaction can be effected more easily; moreover the resulting final product is excellent in various properties. Therefore, the method of the present invention is very effective when stereospecific polymers are used as the starting material.

The following examples are given for the purpose of illustration of this invention and are not intended as limitations thereof. In the examples, "%" and "part" mean by weight unless otherwise specified.

EXAMPLE 1

In 4 l of benzene was dissolved in 200 g of commercially available cis-1,4-polybutadiene BROI (cis-1,4 bond: 95.6%, trans-1,4 bond: 2.7%, vinyl bond: 1.7%, $[\eta]$: 2.0 (meausred in toluene at 30°C), molecular weight: $1.1 \times 10^5$ (measured in toluene by a membrane osmometer)) made by Nippon Gosei Gomu Co., and the resulting rubber solution was charged into a reaction vessel equipped with a stirrer and a Dewar condenser and cooled to 8° to 10°C with ice water. Then, a gaseous mixture of ozone and oxygen, which was generated by means of an ozone generator, was introduced into the rubber solution through a glass ball filter while stirring vigorously the solution. The ozone concentration was adjusted so that 6.3 g of ozone was introduced in 13.5 hours. After completion of the ozonization, dry nitrogen was introduced into the reaction system for about 2 hours to remove excess ozone and oxygen remained in the reaction system. Then, to the resulting ozonide-containing benzene solution was added gradually and dropwise a benzene solution of sodium bis(2-methoxyethoxy)aluminum hydride, $NaAlH_2(OCH_2CH_2OCH_3)_2$, which was prepared by diluting 219.6 ml of a 70% solution of the hydride in benzene, the trade mark of which was Vitride made by Eastman Kodak Co., with 600 ml of benzene (219.6 ml of the 70% benzene solution of the hydride corresponds to 3 times on an equivalent basis based on the amount of ozonides contained in the ozonide-containing benzene solution). After completion of the addition, the bath temperature was kept at 60°C and heating was continued for 3 hours to complete the reaction. The reaction solution was again cooled with ice water, and then 56.6 ml of water was added gradually and dropwise thereto to decompose excess sodium bis(2-methoxyethoxy)aluminum hydride. The benzene solution containing the resulting hydroxyl functional polymer was separated by decantation, and dehydrated and dried with sodium sulfate. Then, the dried benzene solution containing the hydroxyl functional polymer was separated by decantation, and the solvent, benzene, was completely removed to obtain a crude hydroxyl functional polymer. The resulting crude hydroxyl functional polymer was purified in the following manner. The resulting polymer was dissolved in about 600 ml of ethyl ether, and the resulting ether solution was shaken together with the same amount of a dilute aqueous solution of hydrochloric acid for about 30 minutes. Then, the ether solution layer was separated and the same amount of a saturated aqueous solution of sodium chloride was added thereto and the resulting mixture was shaken 2 times. The ether solution layer was washed with water 3 times and again dehydrated and dried with sodium sulfate, and then the solvent was completely removed to recover 142.5 g of a purified hydroxyl functional polymer in a yield of 69.7%.

The resulting polymer had a hydroxyl group equivalent molecular weight of 1,038 (measured by silylation NMR method) and a molecular weight of 2,120 (measured in benzene by VPO method). That is, the polymer had a functionality of 2.04. It was found from the infrared absorption spectrum of the resulting hydroxyl functional polymer that the polymer had the same microstructure as that of the starting material.

The "silylation NMR method" herein used means the following method. A hydroxyl functional polymer is reacted with trimethylchlorosilane and hexamethyldisilazane in a halogenated carbon solvent at room temperature to substitute the proton of the hydroxyl group with the trimethylsilyl group, and the proton of the trimethylsilyl group is analyzed quantitatively by the NMR spectrum in an accuracy as high as 9 times of the accuracy when the proton of the hydroxyl group is directly analyzed, and the number of the protons is calculated into the molecular weight per one hydroxyl functional group. Also in the following Examples, the hydroxyl functional group equivalent molecular weight was determined according to this method.

EXAMPLE 2

The same cis-1,4-polybutadiene BROI as used in Example 1 was used as a starting material, and according to the same procedure as described in Example 1, a solution of 100 g of the cis-1,4-polybutadiene BROI in 2 l of toluene was charged in the same reaction vessel as described in Example 1 and cooled to $-20°C$ in a dry ice-methanol cooling bath. Then, 3.15 g of ozone was introduced into the toluene solution in 8 hours. After completion of the ozonization, dry nitrogen was introduced into the reaction system for 2 hours to remove remained ozone and oxygen, and the temperature of the reaction system was adjusted to $0°C$. Then to the resulting ozonide-containing toluene solution was added gradually and dropwise a solution of sodium bis(2-methoxyethoxy)aluminum hydride in a mixture of benzene and toluene, which was prepared by diluting 74.5 ml of a 70% solution of the hydride in benzene with 150 ml of toluene. (74.5 ml of the 70% benzene solution of the hydride corresponds to 2 times on an equivalent basis based on the amount of ozonides contained in the ozonide-containing toluene solution.) After completion of the addition, the reaction system was heated at $60°C$ for about 3 hours to complete the reaction, cooled to $0°C$; 38.4 ml of water was added to decompose excess sodium bis]2-methoxyethoxy)aluminum hydride. The same after-treatment and purification is described in Example 1 were effected to obtain 79.4 g of a hydroxyl functional polymer in a yield of 78.8%. The resulting polymer had a hydroxyl group equivalent molecular weight of 1,069 (measured by silylation NMR method), and a molecular weight of 2,100 (measured in benzene by VPO method). That is, the polymer had a functionality of 1.96. The resulting polymer was a light yellow, transparent and somewhat viscous liquid polymer.

The resulting hydroxyl functional polymer was reacted with trimellitic anhydride monochloride in an equivalent ratio of the polymer to the monochloride of 1 to 2 to prepare a trimellitoyl functional polymer. Then, according to the method disclosed in U.S. Pat. application Ser. No. 143,645, 100 parts of the above obtained prepolymer having acid anhydride groups at the ends, 15.1 parts of 3,9-bis(2-hydrazide ethyl)-2,4,8,10-tetraoxaspiro[5,5]undecane as a chain extender having hydrazide functional groups at both ends, and 18.1 parts of bisphenol A type diglycidyl ether (Araldite GY-260, made by Ciba Co.) as a curing agent were mixed, and the resulting mixture was cured at $150°C$ for 3 hours to obtain an elastmer sheet. The mechanical properties of the resulting sheet were measured by a tensile tester to obtain the following results.

| Tensile strength at break | 90.7 Kg/cm$^2$ |
| Elongation at break | 140% |
| Modulus at 20% elongation | 282 Kg/cm$^2$ |
| Tear strength | 15.7 Kg/cm |

EXAMPLE 3

The same cis-1,4-polybutadiene BROI as used in Example 1 was used as a starting material and treated in the same procedure, except for the solvent, as described in Example 1. That is, a gaseous mixture of ozone and oxygen, which was generated by means of an ozone generator, was introduced into a solution of 100 g of the cis-1,4-polybutadiene BROI in 2 l of chloroform at room temperature while stirring vigorously the reaction system. The ozone concentration was adjusted so that 3.15 g of ozone was introduced in 9 hours. After completion of the ozonization, dry nitrogen was introduced into the reaction system for 2 hours to remove excess ozone and oxygen remained in the reaction system. After the chloroform was completely removed from the solution of the resulting ozonides by means of a rotary evaporator, the ozonides were dissolved again in 1 l of benzene and reacted with an reducing agent. That is, the benzene solution of the ozonides was cooled to about $8°C$ by means of an ice water bath, and then to the ozonide-containing benzene solution was added gradually and dropwise a benzene solution of sodium bis(2-methoxyethoxy)aluminum hydride, which was prepared by diluting 101.0 ml of a 70% solution of the hydride in benzene with 300 ml of benzene. (101.0 ml of the 70% benzene solution of the hydride corresponds to 3 times on an equivalent basis based on the amount of ozonides.) After completion of the addition, the reaction solution was stirred at $60°C$ for 2 hours to complete the reaction. Then, the reaction solution was again cooled with an ice water bath and then 113.6 ml of water was gradually added to the solution to decompose excess sodium bis(2-methoxyethoxy)aluminum hydride. The same after-treatment and purification as described in Example 1 were effected to obtain 58.4 g of a hydroxyl functional polymer in a yield of 58.2%. The resulting polymer had a hydroxyl group equivalent molecular weight of 1,010 (measured by silylation NMR method) and a molecular weight of 1,889 (measured in benzene by VPO method). That is, the polymer had a functionality of 1.87.

EXAMPLE 4

Commercially available high cis-1,4-polyisoprene Natsyn 2200 (cis-1,4 bond: 98.0%, 3,4-bond: 1.0%, trans-1,4 bond: 1.0%, [$\eta$]: 4.76 (measured in tetrahydrofuran at $25°C$), molecular weight: $3.9 \times 10^5$ (measured in toluene by a membrane osmometer) made by Nippon Gosei Gomu Co.) was used as a starting material and treated in the same procedure as described in Example 3. That is, 100 g of Natsyn 2200 was dissolved in 2 l of chloroform to prepare a rubber solution, and gaseous mixture of ozone and oxygen was introduced into the rubber solution at room temperature under stirring. The ozone concentration was adjusted so that 3.2 g of ozone was introduced in 9 hours. In the same procedure as described in Example 3, after the chloroform was completely removed, the resulting ozonides were dissolved in 1.5 l of benzene, and then to the ozonide-containing benzene solution was added gradually and dropwise a benzene solution of sodium bis(2-methoxyethoxy)aluminum hydride, which was prepared by diluting 111.5 ml of a 70% solution of the hydride in benzene with 300 ml of benzene, while cooling the ozonide-containing benzene solution with ice water. (111.5 ml of the 70% benzene solution of the hydride corresponds to 3 times on an equivalent basis based on the amount of ozonides.) In the same procedure as described in Example 3, excess sodium bis(2-methoxyethoxy)aluminum hydride was decomposed with water, and the resulting mass was subjected to an after-treatment and purified to obtain 75.9 g of a hydroxyl functional polymer in a yield of 74.3%. The resulting polymer had a hydroxyl group equivalent molecular weight of 1,000 (measured by silylation NMR method), and a molecular weight of 1,850 (measured in benzene by VPO method). That is, the polymer had a functionality of 1.85.

Next, 1 equivalent of the above obtained hydroxyl functional polymer was reacted with 2 equivalents of trimellitic anhydride monochloride to prepare a trimellitoyl functional polymer. Then, 100 parts of the above obtained prepolymer having acid anhydride groups at the ends, 15.6 parts of methylene-bis-orthochloroaniline (Cuamine A-103, made by Ihara Chemical Co.) and 23.4 parts of bis-phenol A type diglycidyl ether (Araldite GY-260, made by Ciba Co.) were mixed, and the resulting mixture was cured at 150°C for 3 hours to obtain a brown transparent elastmer. Mechanical properties of the elastmer were measured by means of a tensile tester to obtain the following results.

| Tensile strength at break | 70.8 Kg/cm² |
| Elongation at break | 360% |
| Modulus at 20% elongation | 93 Kg/cm² |
| Tear strength | 11.8 Kg/cm |

EXAMPLE 5

The same cis-1,4-polybutadiene as used in Example 1 was ozonized and reduced under the exactly same conditions as described in Example 3, except that the reducing agent was used in an amount of 2 times on an equivalent basis based on the amount of ozonides, to obtain 70.4 g of a hydroxyl functional polymer in a yield of 68.9%. The resulting polymer had a hydroxyl group equivalent moleculr weight of 1,022 (measured by silylation NMR method), and a molecular weight of 1,870 (measured in benzene by VPO method). That is, the polymer had a functionality of 1.83. The infrared absorption spectrum of the resulting polymer was substantially the same as that of the polymer obtained in Example 3.

EXAMPLE 6

As a starting material in this example, the following polymer was used. The same high cis-1,4-polyisoprene as used in Example 4 was previously masticated by means of a 10 inch roll to prepare a polymer having $[\eta]$ of 1.43 (measured in toluene at 25°C) and a molecular weight of $1.1\times10^5$ (measured in toluene by a membrane osmometer), and the thus masticated polymer was ozonized and reduced under the exactly same conditions as described in Example 3. In this case, the after-treatment and purification were easily carried out due to the low viscosity of the reaction system. 90.7 g of a hydroxyl functional polymer was obtained in a yield of 88.3% The resulting polymer had a hydroxyl group equivalent molecular weight of 780 (measured by silylation NMR method) and a molecular weight of 1,614 (measured in benzene by VPO method). That is, the polymer had a functionality of 2.07.

As seen from the foregoing results, when polymers having a high mastication effect, such as polyisoprene and the like, are previously masticated, and the masticated polymers are used as a starting material, the ozonization, the reduction reaction, the after-treatment and the purification can be easily carried out. Moreover, when the masticated polymers are used, hydroxyl functional polymers having an improved functionality are obtained in a high yield as compared with the case when non-masticated polymers are used.

What is claimed is:

1. A solution method for producing hydroxyl functional polymers having a number average molecular weight of about 500 to 50,000 and containing hydroxyl functional groups at both ends and/or on the side chain, which comprises ozonizing some of the double bonds of homopolymers or copolymers having a high molecular weight and containing olefinically unsaturated double bonds represented by at least one of the general formulae $$-CH=CH- \quad \text{and} \quad CX_2=Ch-$$

wherein X is hydrogen, an alkyl or an aryl group, with a gaseous mixture of carrier gas containing ozone in an amount of 0.1 – 0.5% by weight based on carrier gas, and reducing the resulting ozonides with 0.5 to 3.0 equivalents based on equivalent of said ozonides of sodium bis(2-methoxyethoxy)aluminum hydride at a temperature of −20°C to +100°C to convert the ozonides into the hydroxyl functional polymers.

2. A method as claimed in claim 1 wherein said homopolymer having a high molecular weight and containing the olefinically unsaturated double bonds in the molecule is selected from the group consisting of cis-1,4-polybutadiene and cis-1,4-polyisoprene.

3. A method as claimed in claim 1 wherein the ozonization temperature is 20°C to 30°C.

4. A method as claimed in claim 1 wherein sodium bis(2-methoxyethoxy)aluminum hydride is used in an amount of 1.2 to 2.0 equivalents based on equivalent of the ozonides.

5. A method as claimed in claim 1 wherein reducing the ozonide is effected at a temperature of 0°C to room temperature.

6. A method as claimed in claim 1 wherein said homopolymer or copolymer is dissolved in at least one solvent selected from the group consisting of halogenated hydrocrbons, linear ethers, cyclic ethers, aromatic hydrocarbons, linear paraffins and cyclic paraffins during said ozonizing step.

7. A method as claimed in claim 6 wherein said solvent is selected from the group consisting of chloroform, diethyl ether, tetrahydrofuran, dioxane, benzene, toluene, xylene, pentane, hexane, heptane and cyclohexane.

8. A method as claimed in claim 6 wherein the amount of said homopolymer or copolymer is between 0.1 g and 50 g per 100 ml of solvent.

9. A method as claimed in claim 8 wherein the amount of said homopolymer or copolymer is between 1 and 10 g per 100 ml of solvent.

10. A method as claimed in claim 1 wherein said reducing agent is added to said ozonides in a solvent which will not react with said agent and which dissolves said ozonides homogeneously.

11. A method as claimed in claim 10 wherein said solvent is selected from the group consisting of aromatic hydrocarbons, aliphatic ethers, cyclic ethers and cyclic hydrocarbons.

12. A method as claimed in claim 11 wherein said solvent is selected from the group consisting of benzene, toluene, xylene, dimethyl ether, diethyl ether, di-n-propyl ether, di-i-propyl ether, di-n-butyl ether, tetrahydrofuran, dioxane, ethylene glycol dimethyl ether, diethylene glycol dimethyl ether, triethylene glycol dimethyl ether, cyclobutane and cyclohexane.

13. A method as claimed in claim 1 wherein said reducing step is carried out over a period of between 0.5 and 24 hours.

14. A method as claimed in claim 1 wherein said ozonizing step and said reducing step are carried out in benzene solution.

15. A method as claimed in claim 1 further comprising decomposing any excess of said reducing agent by adding water or a dilute solution of an acid to the reaction system after said reducing step has been completed.

16. A method as claimed in claim 1 further comprising recovering said hydroxyl functional polymers after said reducing step has been completed.

17. A method as claimed in claim 1 further comprising the step of masticating said homopolymer or copolymer prior to said ozonizing step.

18. A method as claimed in claim 1 wherein said carrier gas is selected from the group consisting of oxygen, nitrogen, air and argon.

* * * * *